March 28, 1961  W. H. PARKER  2,976,909
TOOL FOR AFFIXING LININGS TO BRAKE SHOES
Filed March 21, 1960  3 Sheets-Sheet 1

INVENTOR.
WARREN H. PARKER
BY
Gardner & Zimmerman
ATTORNEYS

March 28, 1961   W. H. PARKER   2,976,909
TOOL FOR AFFIXING LININGS TO BRAKE SHOES
Filed March 21, 1960   3 Sheets-Sheet 2
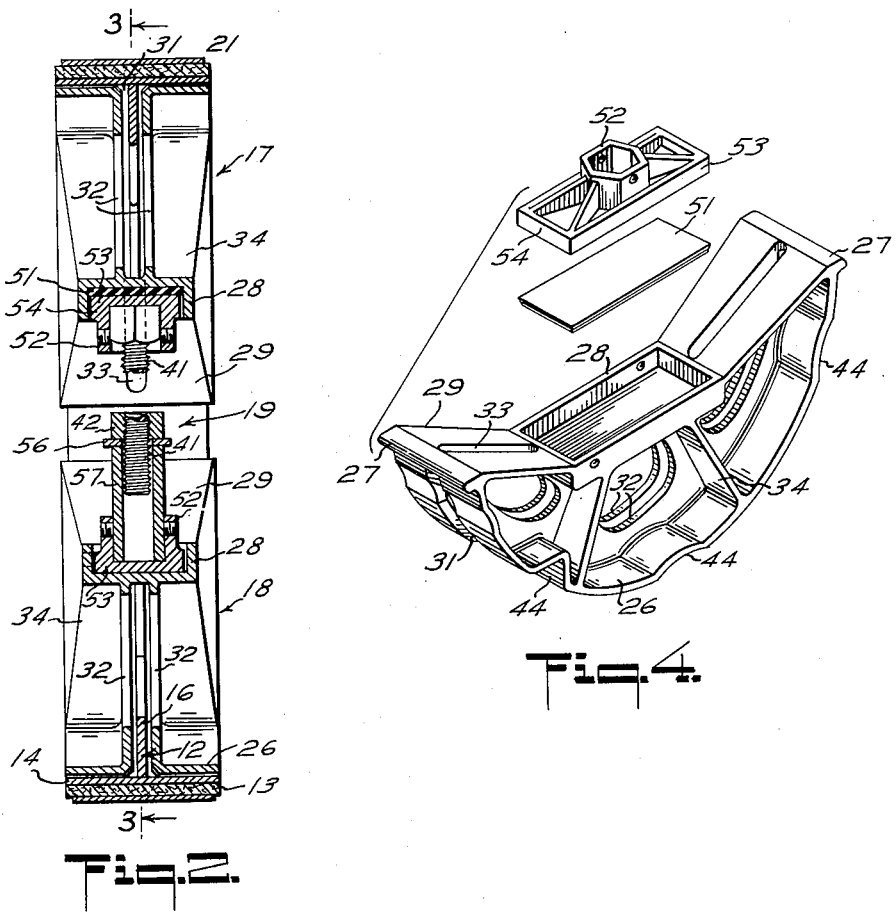
INVENTOR
WARREN H. PARKER
BY
Gardner + Zimmerman
ATTORNEYS March 28, 1961  W. H. PARKER  2,976,909
TOOL FOR AFFIXING LININGS TO BRAKE SHOES
Filed March 21, 1960  3 Sheets-Sheet 3
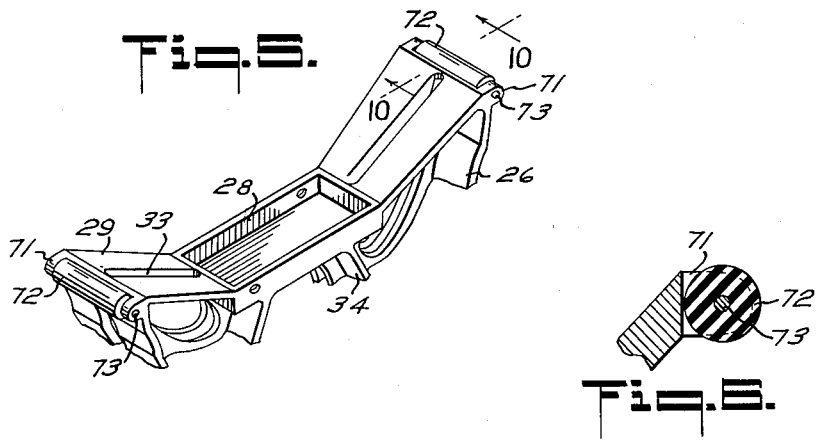
INVENTOR
WARREN H. PARKER
BY
Gardner & Zimmerman
ATTORNEYS United States Patent Office 2,976,909
Patented Mar. 28, 1961

2,976,909

TOOL FOR AFFIXING LININGS TO BRAKE SHOES

Warren H. Parker, 2851 Morgan Ave., Oakland, Calif., assignor of one-third to Charles W. Butler, and one-third to Charles Bork, both of Oakland, Calif.

Filed Mar. 21, 1960, Ser. No. 17,732

9 Claims. (Cl. 154—1)

This invention generally relates to the art of manufacturing brake shoes and the linings therefor, and is more particularly directed towards a tool or fixture for use in pressure-bonding the lining to the brake shoe flange. The present application comprises a continuation in part of my copending application, Serial No. 633,422 filed January 10, 1957, now abandoned.

In conventional brake shoe construction the shoe is formed with a central planar portion of generally semi-circular shape and an arcuate flange disposed generally normal to the plane of said portion and extending from both surfaces of the latter. In use, the brake shoes are expanded so as to force said flanges towards the inner surface of the brake drum and accordingly, it is accepted practice to apply a lining to the outer arcuate surface of the shoe flange, the lining being of a suitable friction material such as asbestos and adapted to engage the drum.

In view of the tremendous forces created upon the forcing of the lining against the brake drum, it is essential that the lining be affixed to the shoe flange in such a manner as to prevent any tendency for the lining to slip, buckle or otherwise be moved from its proper seated position. While there are presently available tools for pressing an adhesively coated lining on the shoe flange, and maintaining such pressure during a subsequent baking operation, it has been found that such tools are subject to criticism primarily in failing to apply equal pressure along the length of the lining and thereby weakening the finished bond.

It is therefore an object of the present invention to provide a fixture or tool for bonding a lining to a brake shoe in which the pressure forces are substantially equally distributed along the entire length and width of the lining.

Another object of this invention is to provide a tool of the character described in which a brake shoe with an adhesively coated lining applied thereto is forced against a relatively thin metal band whereby the lining is pressed between the shoe and band, and in which means are provided for engaging the band independently of the engagement thereof with the lining so as to insure a smooth uniform application of pressure to the lining and the elimination of objectionable crimping or other deformation of the band.

A further object of the invention is to provide a tool or fixture as above described in which the brake shoe flange will be engaged along substantially the entire length and width thereof thereby providing a rigid and uniform support and an equal application of pressure between the flange and its applied lining.

Yet another object of this invention is to provide a fixture of the type described in which the pressure applying mechanism incorporates a resilient member to provide for proper alignment and distribution of forces, such member being capable of withstanding the subsequent baking temperatures and being readily replaceable upon wearing out.

Still another object of the invention is to provide a fixture as above described in which novel means are provided for freely maintaining the band in desired relationship with the lining and with other portions of the fixture.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 2 is a transverse cross-sectional view of the fixture taken substantially in the plane indicated by line 2—2 of Figure 1.

Figure 4 is an exploded perspective view of a portion of the fixture.

Figure 5 is a portional view similar to Figure 4, but illustrating a modified form of fixture.

Figure 6 is a cross sectional view taken substantially in the plane indicated by line 6—6 of Figure 5.

Figure 3:
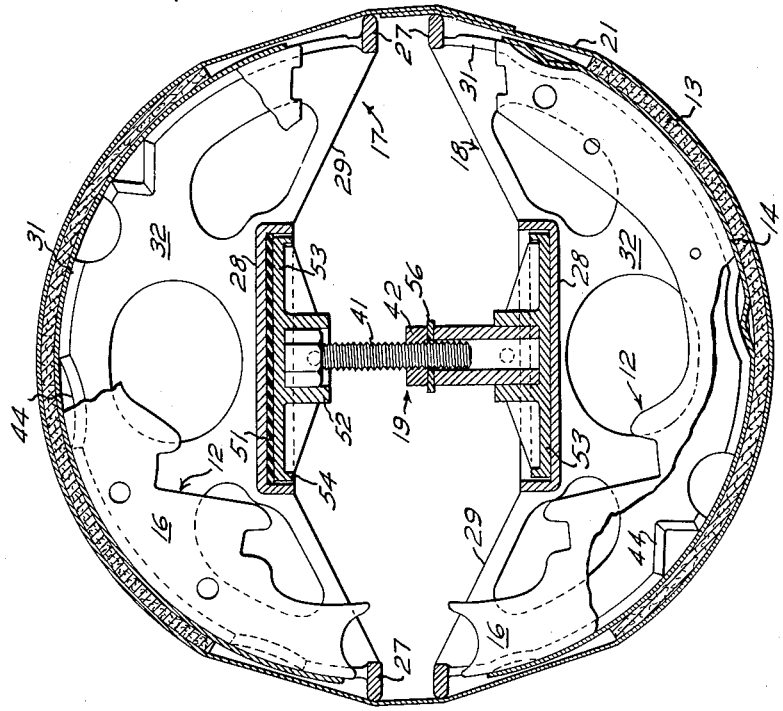
Figure 3 is a longitudinal cross-sectional view taken substantially in the plane indicated by line 3—3 of Figure 2.
Figure 1:
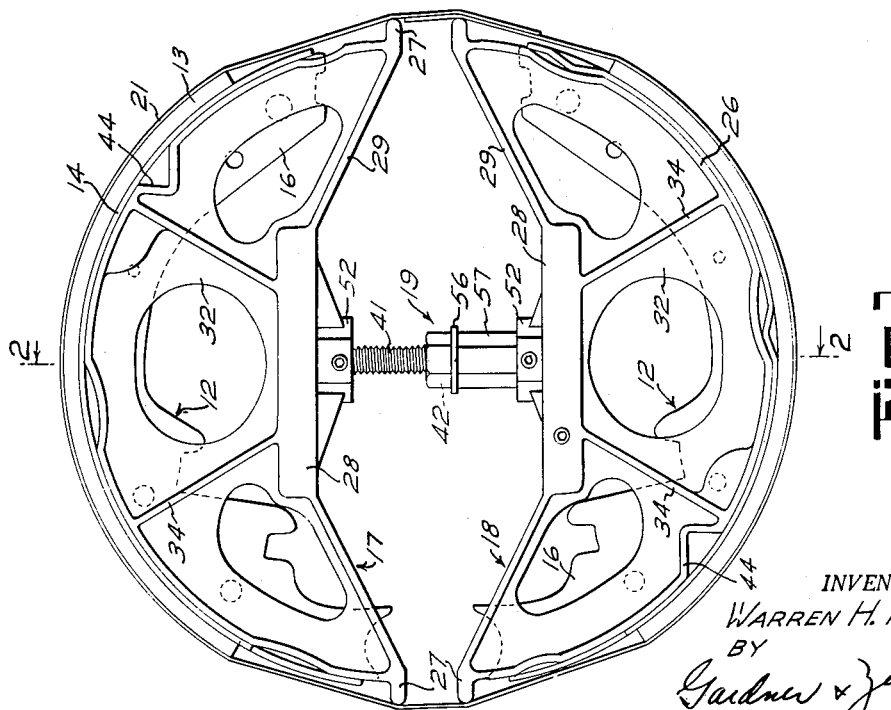
Figure 1 is a plan view of the fixture of the present invention in operative use with a pair of brake shoes.

In affixing the lining to a brake shoe flange, it has become accepted practice to apply a suitable adhesive between the lining and flange, and then forcibly press the two together while subjecting the same to elevated temperatures for effecting a setting of the adhesive and a proper bond between the lining and shoe. As a typical example of a tool or fixture utilized for performing the above operation, a pair of brake shoes may be positioned in diametrically opposed relation on holders which may be selectively moved from and towards each other by means of screw threads or the like. Encompassing both shoes is an annular band in engagement with the linings, and as will be understood, when the holders and the shoes held thereby are forced apart, the linings will be clamped between the shoe flange and band. The fixture may then be passed through a baking oven or the like, and upon setting of the adhesive, the holders are retracted, thereby releasing the band, and the shoes with their applied linings removed. Another set of shoes may then be inserted and the process repeated. As previously explained, it has been found that with the fixtures currently used, the bond between the shoe and lining was not completely satisfactory; and also, the manner of constructing such fixtures resulted in numerous occasions of damage to the backing bands and/or to portions of the fixture itself, thereby further reducing its efficiency or requiring continuous replacement.

The defects of the prior art have been eliminated with the fixture of the present invention, and with reference to the drawings, such fixture will be seen in operative position with a pair of brake shoes 12, each having a lining to be adhesively applied to the shoe flange 14. As is well known, the shoe 12 is of T-shaped cross-sectional form having a web 16 intersecting the flange 14, and the shoe is curved along the length thereof, such length usually comprising less than 180 degrees of arc. The lining 13 is placed against the outer peripheral surface of flange 14, being generally coextensive with the flange width and usually terminating inwardly of the flange ends.

In broad terms, the fixture for applying pressure to the lining 13 includes a pair of brake shoe holders, generally indicated by the numerals 17 and 18, means 19 for forcibly urging the holders and the shoes held thereby outwardly or away from each other, and a continuous metal band 21 encompassing the holders, shoes and linings and which serves as a backing member for the linings upon outward movement of the shoes.

The two holders are substantially identical and are symmetrically positioned about the spreading means 19, and consequently, reference may be particularly had to Figure 4 of the drawings wherein one of the holders is best illustrated.

As shown, each of the holders 17 and 18 has a generally semi-cylindrical configuration with a flange 26 constituting the outer peripheral surface thereof. Attention is directed to the fact that the distal ends of the flange are each provided with a continuous bead 27 coextensive with the width of the flange and extending radially beyond the outer surface of the flange. The function of these beads will be hereinafter explained in detail. Interconnecting the arcuate flange ends is a generally diametrically extending flange, such flange including a central rectangular outwardly recessed socket portion 28 which is in a plane substantially parallel to a plane interior nesting the ends of the flange, and as here shown, spaced radially inwardly of said latter plane. Thus, in the illustrated arrangement, the ends of socket portion 28 then extend radially outwardly in generally flat portions 29 to terminate at the beads 27.

With reference to Figures 2 and 3 of the drawings, it will be seen that the socket portions 28 of the respective holders 17 and 18 have their openings in opposed relation whereby the expanding means 19 may be positioned therebetween for forcing the holders apart. The particular form of expanding mechanism will be later discussed.

To complete the description of the holder, the flange 26 thereof is provided with a continuous slot 31 disposed medially of the width thereof and extending between the beads. A pair of parallel webs 32 extend generally normal from the inner surface of flange 26 at the edges of slot 31 and are likewise interconnected to portions 28 and 29 of the holder, the latter portions likewise having slots 33 between the webs 32. Also, for the purpose of reinforcing a holder, a plurality of radial ribs 34 are provided on each side of the webs and extend between the socket portion 28 and flange 26.

The means 19 for effecting separation of the two holders may assume a variety of forms, such as a power actuated mechanism. However, for reasons of economy and simplicity, such means preferably includes a bolt 41 extending between the opposed socket portions 28, the head of the bolt being positioned adjacent one of such portions, and a nut 42 threadedly engaged with said bolt operatively bearing on the other socket portion. In this manner, the operation of the fixture should be apparent.

First, one of the brake shoes is positioned in each holder by inserting the shoe web 16 through slot 31 in the holder flange until the shoe flange 14 engages the outer surface of holder flange 26. It is important to note that after such insertion, the holder flange extends beyond the ends of the shoe flange while the widths of the two flanges are substantially coextensive. Thus, except for indentions 44 on the flange 26, the entire inner surface of the shoe flange will be engaged by the flange 26. Then assuming that the lining 13 has been applied to flange 14 by a suitable adhesive, the band 21 may be positioned in encircling relation to the pair of opposed linings. By rotating nut 42 in a direction away from the bolt head, the two holders will be forced apart, thereby compressing the linings between the bands and shoe flanges and insuring a proper bond of the linings on the shoes.

It is important to note that by virtue of the continuous holder flange 26 and the width thereof, coupled with the reinforcing ribs and web construction and the positioning of the socket portions, the diametrically applied force created by rotation of the nut 42 will be substantially equally distributed along the entire length of the holder flange. Since the band is intended for repeated usage, it is also important to prevent deformation thereof while insuring that the pressure at the ends of the linings is equal to the pressure applied to intermediate portions thereof. This is accomplished by means of the beads 27 which engage the band and aside from the lining are the only portions of the holder which actually contact the band. In absence of such beads, the lining could be bent inwardly upon spreading of the holder and undesirably engage the flange of the shoe, the holder, or both.

As an important feature of this invention, resilient means are incorporated with the expanding means 19 to insure a proper application and distribution of forces. As here illustrated, a resilient and replaceable pad 51 is placed in one of the sockets 28, although obviously such a pad could be positioned in each socket. This pad, while having a degree of resiliency must be capable of withstanding baking temperatures. A silicon rubber having a 35 to 80 Shore Durometer reading has been found extremely effective for this purpose. The head of bolt 41 is snugly engaged in a socket 52 of a plate 53, the latter having a peripheral flange 54 and suitable reinforcing webs. The flat side of the plate is positioned against the pad 51 and the flange 54 is slightly spaced from the side walls of socket portion 28. Nut 42 engages a washer 56 which in turn bears against a hollow hexagonal socket 57 which in turn is seated in the socket 52 of the other plate member 53. This arrangement insures a distribution of the axial force created by rotation of the nut first to the plates 53, through the pad or pads 51 to the socket portions 28, and thence to the holder flange.

In Figures 5 and 6 a modified form of band engaging means is provided in place of the beads 27 above described and which minimizes frictional resistance between such means and the band while properly maintaining the latter in spaced relation to other portions of the fixture with little danger of crimping the band. As shown in said figures, the opposed edges at each end of flange 26 are provided with bearing yokes or ears 71 extending radially beyond the outer surface of the flange. A roller 72 provided with an axial shaft 73 is mounted between the yokes and extends beyond the same with the shaft 73 being journalled in the yokes. Thus, band 21 will engage a journalled roller in place of a fixed flange or bead and further enhance the utility of the apparatus.

What is claimed is:

1. A tool of the character described including a pair of opposed brake shoe holders arranged to engage an annular backing band, each of said holders having a rigid arcuate peripheral flange extending for approximately 180 degrees of arc and a rigid cross member interconnecting the ends of said arcuate flange, a pair of spaced diametrically extending web members interconnecting said flange and member medially of the widths thereof, said arcuate flange further having a continuous slot communicating with the space between said web members whereby a brake shoe web may be inserted through said slot and between said webs, spacer means provided adjacent the distal ends of said arcuate flanges and extending generally radially outwardly therefrom a distance substantially equal to the thickness of a brace shoe flange and lining therefor and adapted to engage portions of the band, and extensible means interconnecting the central portions of the cross members of each holder.

2. A tool of the character described adapted for use with an annular backing member, comprising a pair of opposed brake shoe holders, each of said holders having an arcuate peripheral flange, the distal ends of said flanges having radially outwardly extending projections thereon extending for substantially the width thereof and adapted to space portions of the band from said ends, each holder further having a generally diametrically extending flange interconnecting the ends of said arcuate flange and having a central depressed outwardly directed socket portion, a pair of parallel webs interconnecting said flanges, a plate insertible in the socket portion of each holder, one of said plates having a threaded bolt element extending therefrom and the other plate being in rotatable engagement with a nut member threaded on said element whereby upon rotation of said nut member in one direction said holders will be forced apart.

3. Apparatus of the character described comprising a pair of opposed brake shoe holders, each of said holders having an arcuate peripheral flange adapted to engage the inner peripheral surface of a brake shoe flange, each holder further having a load bearing member positioned along a diameter substantially bisecting said flange and lying in a plane substantially parallel to a tangential plane at the intersection of said diameter and said flange, rigid means interconnecting said load member and said flange, means interconnecting the members on the respective holders for forcible separation thereof along said diameter, and a resilient pad-like element operatively positioned between said last named means and at least one of said load bearing members for equalizing the load applied to said member.

4. A tool for affixing linings to brake shoe flanges adapted for use with an annular backing band for holding the shoes on the tool, comprising a pair of opposed brake shoe holders, each of said holders having a rigid arcuate peripheral flange against which the inner peripheral flange surface of a brake shoe is to be positioned and of a length to extend beyond the ends of the brake shoe flange, means extending between said holders operable for moving said holders radially apart whereby a brake shoe and the lining thereon will be compressed between said arcuate flange and the backing band, means on said holders extending radially outwardly from said flanges adjacent the ends thereof and adapted to engage the band and maintain same in spaced relation to said arcuate flange between the end of the lining and the adjacent end of the arcuate flange.

5. A tool as set forth in claim 4 further characterized by said outwardly extending means projecting a radial distance beyond said flange substantially equal to the thickness of the brake shoe flange and lining.

6. A tool of the character described including a pair of opposed brake shoe holders arranged to engage an annular backing band, each of said holders having an arcuate peripheral flange extending for approximately 180° of arc so as to be of greater arcuate extent than an associated brake shoe, each holder also having a cross member interconnecting the ends of said arcuate flange and with there being body portions extending between each flange and its associated cross member, each flange having a continuous slot extending longitudinally medially thereof to receive the web of a brake shoe, each cross member having an intermediate portion disposed in a plane substantially parallel to a plane interconnecting the opposite ends of said arcuate flange, and extensible means interconnecting the intermediate portions of said cross members of each holder for spreading the holders apart towards said annular backing band.

7. A tool of the character described including a pair of opposed brake shoe holders arranged to engage an annular backing band, each of said holders having an arcuate peripheral flange extending for approximately 180° of arc so as to be of greater arcuate extent than an associated brake shoe, each holder also having a cross member interconnecting the ends of said arcuate flange and being of a width substantially equal to the width of the flange and with there being substantially radial webs extending between each flange and an intermediate portion of its associated cross member, each flange having a continuous slot extending longitudinally medially thereof to receive the web of a brake shoe, each cross member having opposite end portions sloping downwardly and inwardly with respect to said arcuate flange and being interconnected by an intermediate portion disposed within a plane parallel to a plane interconnecting the opposite ends of said arcuate flange, extensible means interconnecting the intermediate portions of said cross members of each holder for spreading the holders apart towards said annular backing band, said intermediate portion of each cross member being provided with an outwardly facing pocket within which a corresponding end of said extensible means is seated.

8. A tool of the character described including a pair of opposed brake shoe holders adapted to engage an annular backing band, each holder having an arcuate peripheral flange and a cross member interconnecting the ends of said flange, said flange having a continuous slot along the length thereof adapted to receive the web of a brake shoe, extensible means interconnecting the central portions of the cross members of each holder, and roller means mounted on said flanges adjacent the ends thereof for rotation about an axis generally normal to a line interconnecting the ends of said flanges of each holder.

9. A tool as set forth in claim 8 in which said last named means includes a bearing ear forming a general continuation of said cross member adjacent each edge of said flange, and a roller journalled for rotation between said ears and extending radially beyond the same.

No references cited.